(12) United States Patent
Kracke et al.

(10) Patent No.: US 11,079,310 B2
(45) Date of Patent: Aug. 3, 2021

(54) WEAR CHECK TOOL FOR UNIVERSAL JOINT

(71) Applicant: Goodrich Actuation Systems Limited, West Midlands (GB)

(72) Inventors: Jeremy Kracke, Staffordshire (GB); Tom R. Williamson, West Midlands (GB)

(73) Assignee: GOODRICH ACTUATION SYSTEMS LIMITED, Solihull West Midlands (GB)

( * ) Notice: Subject to any disclaimer, the term of this patent is extended or adjusted under 35 U.S.C. 154(b) by 270 days.

(21) Appl. No.: 16/407,231

(22) Filed: May 9, 2019

(65) Prior Publication Data

US 2019/0360906 A1 Nov. 28, 2019

(30) Foreign Application Priority Data

May 23, 2018 (EP) ..................................... 18275069

(51) Int. Cl.
*F16C 11/04* (2006.01)
*G01N 3/56* (2006.01)

(52) U.S. Cl.
CPC ................ *G01N 3/56* (2013.01); *F16C 11/04* (2013.01)

(58) Field of Classification Search
CPC ..................................................... F16C 11/04
USPC .............................................................. 73/9
See application file for complete search history.

(56) References Cited

U.S. PATENT DOCUMENTS

| 2,938,274 | A | | 5/1960 | Gold |
| 3,438,135 | A | | 4/1969 | Bense |
| 4,626,121 | A | * | 12/1986 | Tajima ................... F16C 11/086 116/208 |
| 4,790,079 | A | | 12/1988 | Meyers |
| 4,893,395 | A | | 1/1990 | Crowder |
| 5,197,339 | A | | 3/1993 | Dutkiewicz et al. |
| 5,718,633 | A | * | 2/1998 | Gehrke ...................... F16D 3/41 464/23 |

FOREIGN PATENT DOCUMENTS

| EP | 0177184 A1 | 4/1986 |
| WO | 9628665 A1 | 9/1996 |

OTHER PUBLICATIONS

Extended European Search Report for International Application No. 18275069.5 dated Nov. 16, 2018, 5 pages.

* cited by examiner

*Primary Examiner* — Walter L Lindsay, Jr.
*Assistant Examiner* — Philipmarcus T Fadul
(74) *Attorney, Agent, or Firm* — Cantor Colburn LLP

(57) ABSTRACT

A tool for checking wear in a Cardan joint comprises a base element, a trigger plate, an indicator pin, an indicator pin carrier and an indicator pin biasing element. The trigger plate is pivotally mounted to the base element about a trigger plate pivot axis (A) for pivotal movement between a first pivotal position and a second pivotal position. It has, at one end, a trigger plate yoke with a pair of opposed arms for engaging over one arm of a second yoke member of the Cardan joint and, at another end, an indicator pin opening. The indicator pin carrier is pivotally mounted to the base element to permit the angular position of the indicator pin carrier to be adjusted relative to the trigger plate. The indicator pin carrier is arranged between the base element and the trigger plate.

15 Claims, 10 Drawing Sheets

WEAR CHECK TOOL FOR UNIVERSAL JOINT

FOREIGN PRIORITY

This application claims priority to European Patent Application No. 18275069.5 filed May 23, 2018, the entire contents of which is incorporated herein by reference.

TECHNICAL FIELD

The present disclosure relates to a wear check tool for a universal joint.

BACKGROUND

Universal joints, or Cardan joints as they are sometimes known, are used in a wide range of applications where it is necessary to accommodate misalignment of rotary shafts. For example, one application of Cardan joints is in mechanically driven high lift systems of aircraft. A transmission shaft connects slat-operating actuators at a number of wing stations. The shaft may comprise a plurality of solid straight shaft sections with Cardan joints arranged between the shaft sections to compensate for axial misalignment of the shaft sections.

A typical Cardan Joint comprises an input yoke member comprising a pair of arms with aligned openings, an output yoke member comprising a pair of arms with aligned openings and a hub or cross member having trunnions extending therefrom for engagement in the aligned openings of the input and output yoke members. The trunnions are typically received in bushings in the openings to facilitate rotation of the yoke members about the trunnions in use. However, during use, the bushings will wear, thereby introducing undesired rotational play into the joint. Once the play becomes too great, for example if it exceeds say 2 degrees, the Cardan joint will have to be refurbished or replaced. Regular inspections of the joints are therefore carried out. At present, this is done manually and is a somewhat subjective exercise.

SUMMARY

The present disclosure provides a tool for checking wear in a Cardan joint. The tool comprises a base element, a trigger plate, an indicator pin, an indicator pin carrier and an indicator pin biasing element. The base element comprises a base element yoke having a pair of opposed arms for engaging over the ends of an opposed pair of trunnions mounted in openings in opposed arms of a first yoke member of the Cardan joint. The trigger plate is pivotally mounted to the base element about a trigger plate pivot axis for pivotal movement between a first pivotal position and a second pivotal position. It has, at one end, a trigger plate yoke with a pair of opposed arms for engaging over one arm of a second yoke member of the Cardan joint and, at another end, an indicator pin opening. The indicator pin carrier is pivotally mounted to the base element to permit the angular position of the indicator pin carrier to be adjusted relative to the trigger plate. The indicator pin carrier is arranged between the base element the trigger plate, for example between a lower surface of the trigger plate and an upper surface of the base element. The indicator pin comprises an indicator pin head which extends into the indicator pin opening in the trigger plate and a trigger shoulder for engagement under a surface of the trigger plate adjacent the indicator pin opening in a first pivotal position of the trigger plate for maintaining the indicator pin in a retracted position and for disengagement from the surface of the trigger plate in a second pivotal position of the trigger plate such that the indicator pin may move to an extended position in which the indicator pin head protrudes or protrudes further from the indicator pin opening.

The indicator pin carrier may comprises a bore for receiving the indicator pin and the biasing element may comprise a biasing spring received within the bore for biasing the indicator pin out of the bore.

The indicator pin carrier may be pivotally mounted to the base element about the trigger plate pivot axis.

The indicator pin carrier may comprise a calibration slot permitting the adjustment of the angular position of the indicator pin carrier relative to the trigger plate.

A holding element may extend through the adjustment slot for holding the indicator pin carrier in the desired angular position.

The holding element may be a screw fastener.

The base element may further comprise a retaining arm extending over the trigger plate and the indicator pin carrier, and a pivot pin may be mounted between the retaining arm and the base element, the trigger plate and/or the indicator pin carrier being pivotally mounted about the pivot pin.

The tool may further comprise a retaining element for selectively retaining the base element to the Cardan joint.

The retaining element may be is pivotally mounted to a lower portion of the base element and be pivotable between an open position which permits the base element yoke to be positioned on the Cardan joint and a closed position which retains the base element to the Cardan joint.

The indicator pin may further comprise a retaining shoulder which is engageable beneath the surface of the trigger plate in the second pivotal position of the trigger plate to limit the protrusion of the indicator pin head from the trigger plate opening.

The arms of the base element yoke may be resilient.

The arms of the trigger plate yoke may be resilient.

Inwardly facing distal end portions of the arms of the base element yoke may be rounded or chamfered.

Distal end portions of the arms of the trigger plate yoke may be rounded or chamfered.

The disclosure also provides a method of checking for excessive wear in a Cardan joint using a tool as defined above comprising rotating the first and second yoke members of the Cardan joint to a position of maximum backlash; mounting the tool to the Cardan joint such that the base element yoke arms engage over the ends of an opposed pair of trunnions mounted in opposed arms of the first yoke member of the Cardan joint and the trigger plate yoke arms engage over the one arm of the second yoke member of the Cardan joint; retracting the indicator pin into the bore of the indicator pin carrier; adjusting the angular position of the indicator pin carrier relative to the trigger plate such that a circumferentially outer portion of the indicator pin head engages with an internal circumferential surface portion of the trigger plate opening; rotating the second yoke member of the Cardan joint about its rotational axis while preventing rotation of the first yoke member of the Cardan joint about its rotational axis, or vice versa, relative rotation of the first and second yoke members of the Cardan joint causing the trigger plate to rotate about the trigger plate pivot axis; and determining that excessive wear has occurred if the rotation of the trigger plate is such that the indicator pin head moves from its retracted position to its extended position.

BRIEF DESCRIPTION OF DRAWINGS

An embodiment of this disclosure will now be described by way of example only with reference to the accompanying drawings in which.

DETAILED DESCRIPTION

Figure 1:
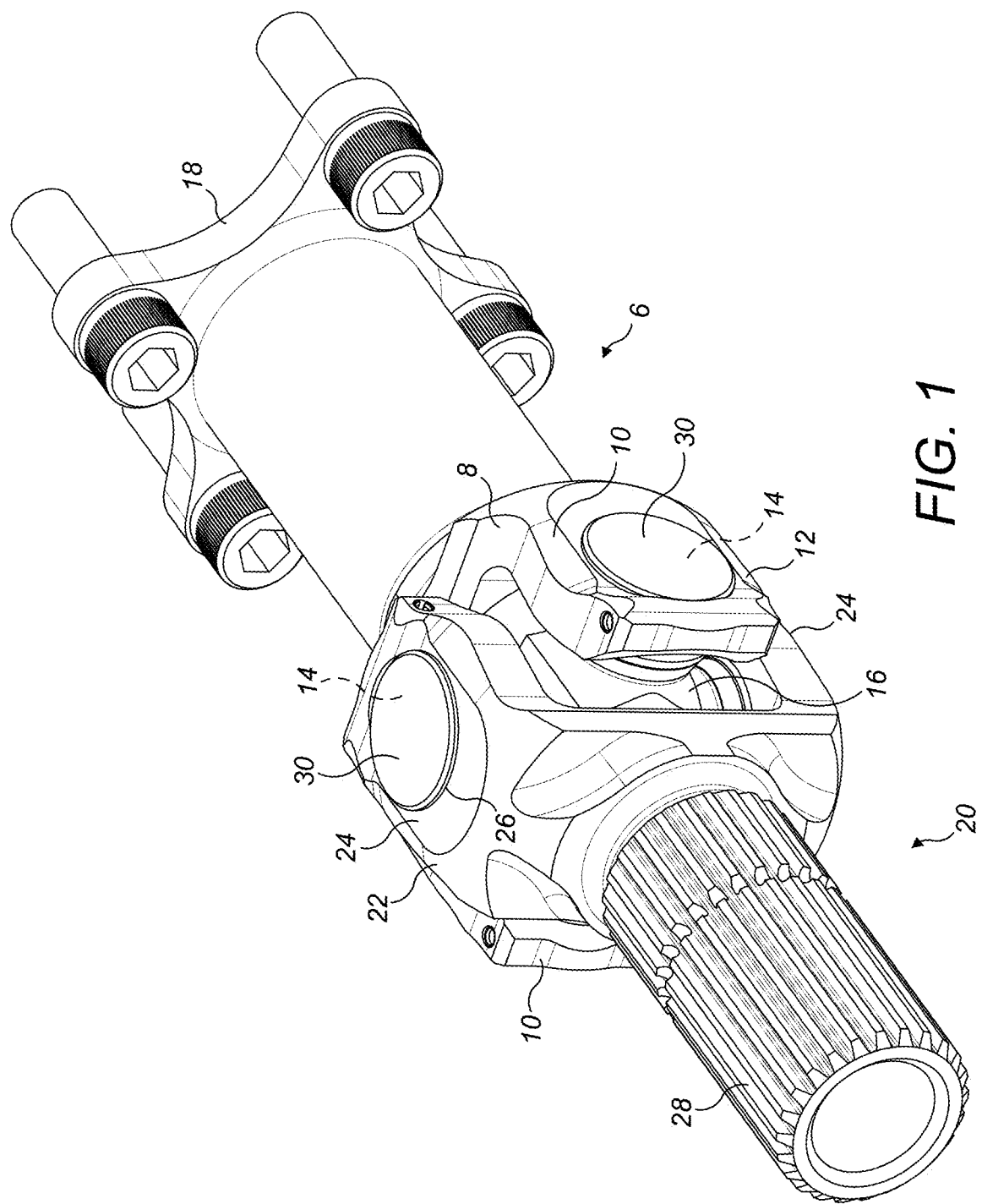
FIG. 1 shows a perspective view of an exemplary Cardan joint which may be assessed using a tool in accordance with the disclosure.
Figure 2:
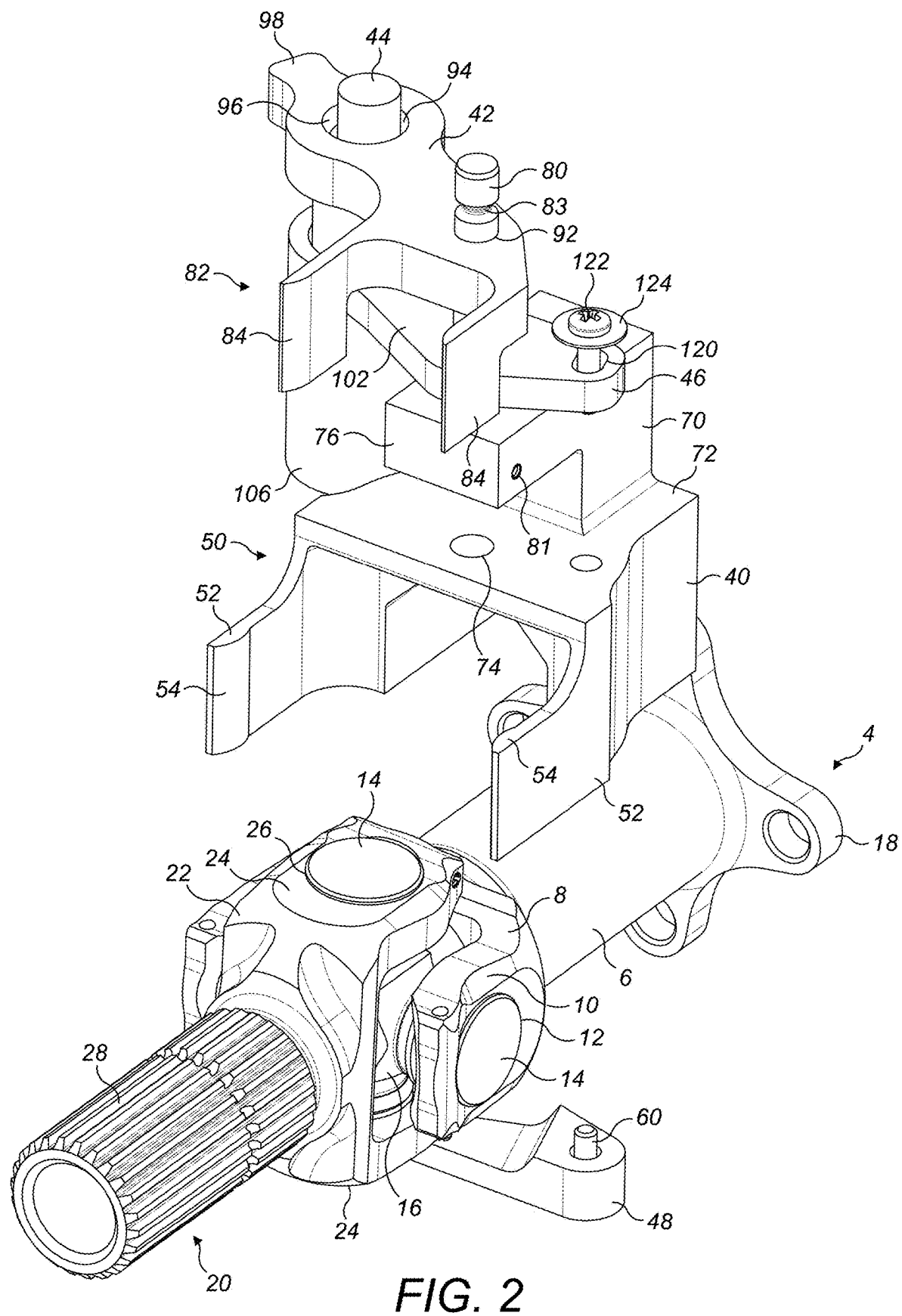
FIG. 2 shows the Cardan joint of FIG. 1, with an exploded view of a tool in accordance with the disclosure.
Figure 3:
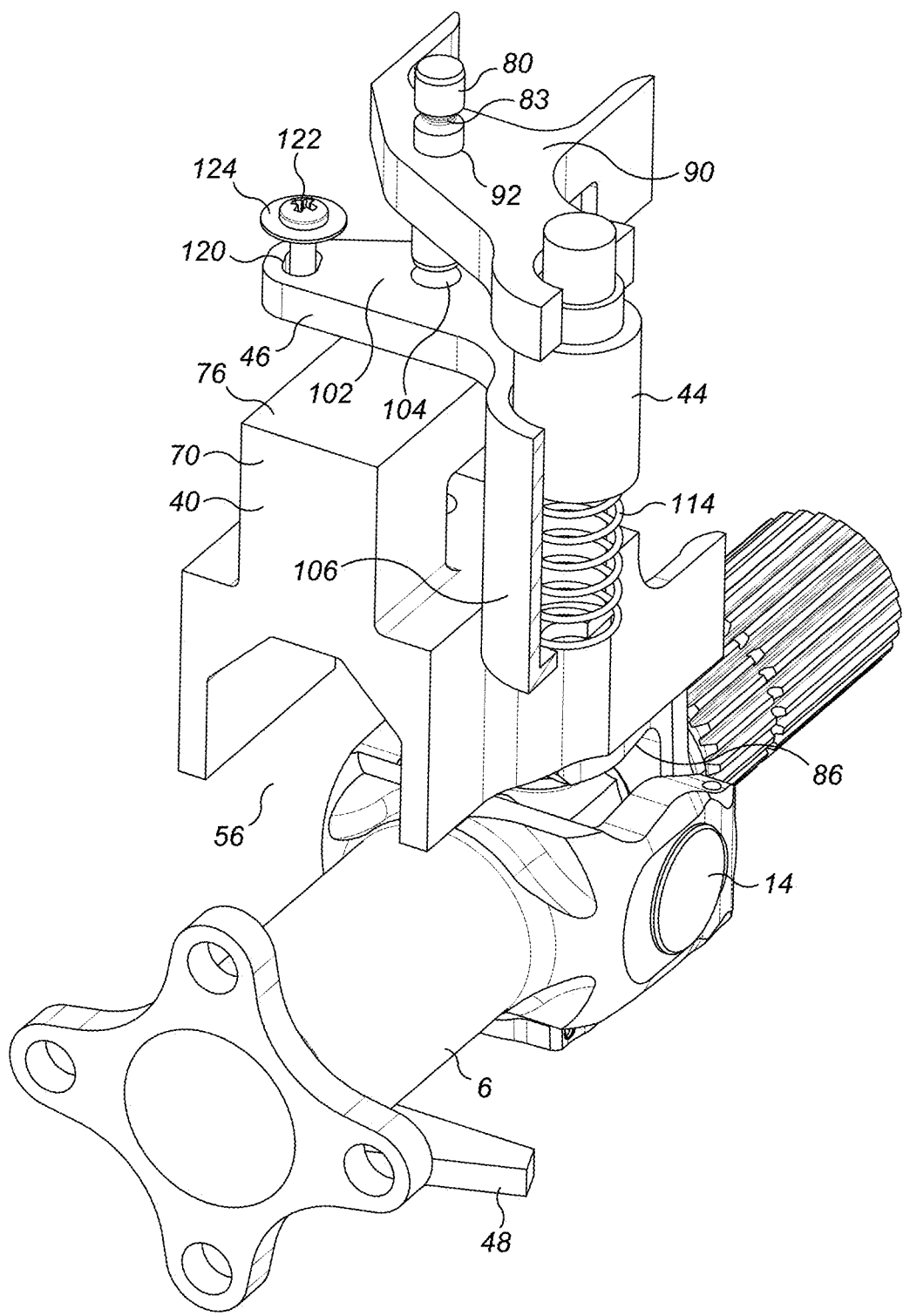
FIG. 3 shows a reverse exploded, partially sectioned view of FIG. 2.

With reference firstly to FIGS. 1 to 3, a wear check tool 2 in accordance with an embodiment of the disclosure is intended to be mounted to a Cardan joint 4 which can be seen, for example in FIG. 1.

The Cardan joint 4 comprises a first part 6 which comprises a first yoke member 8 having opposed arms 10. As is known in the art, the arms 10 of the first yoke member 8 comprise openings 12 which receive respective trunnions 14 of a hub or cross member 16. As is known in the art, the hub 16 comprises four trunnions 14 arranged at 90° to one another. In this embodiment, one end of the first part 6 comprises a flange 18 for connecting to another component (not shown). Of course other forms of coupling may be provided as appropriate.

The Cardan joint 4 further comprises a second part 20. This second part 20 comprises a second yoke member 22 also having opposed arms 24 having openings 26 for receiving further trunnions 14 of the hub 16. In this embodiment, the second part 20 comprises a splined coupling 28 for connection to another component (not shown). Again other forms of coupling may be provided as appropriate.

Figure 9:
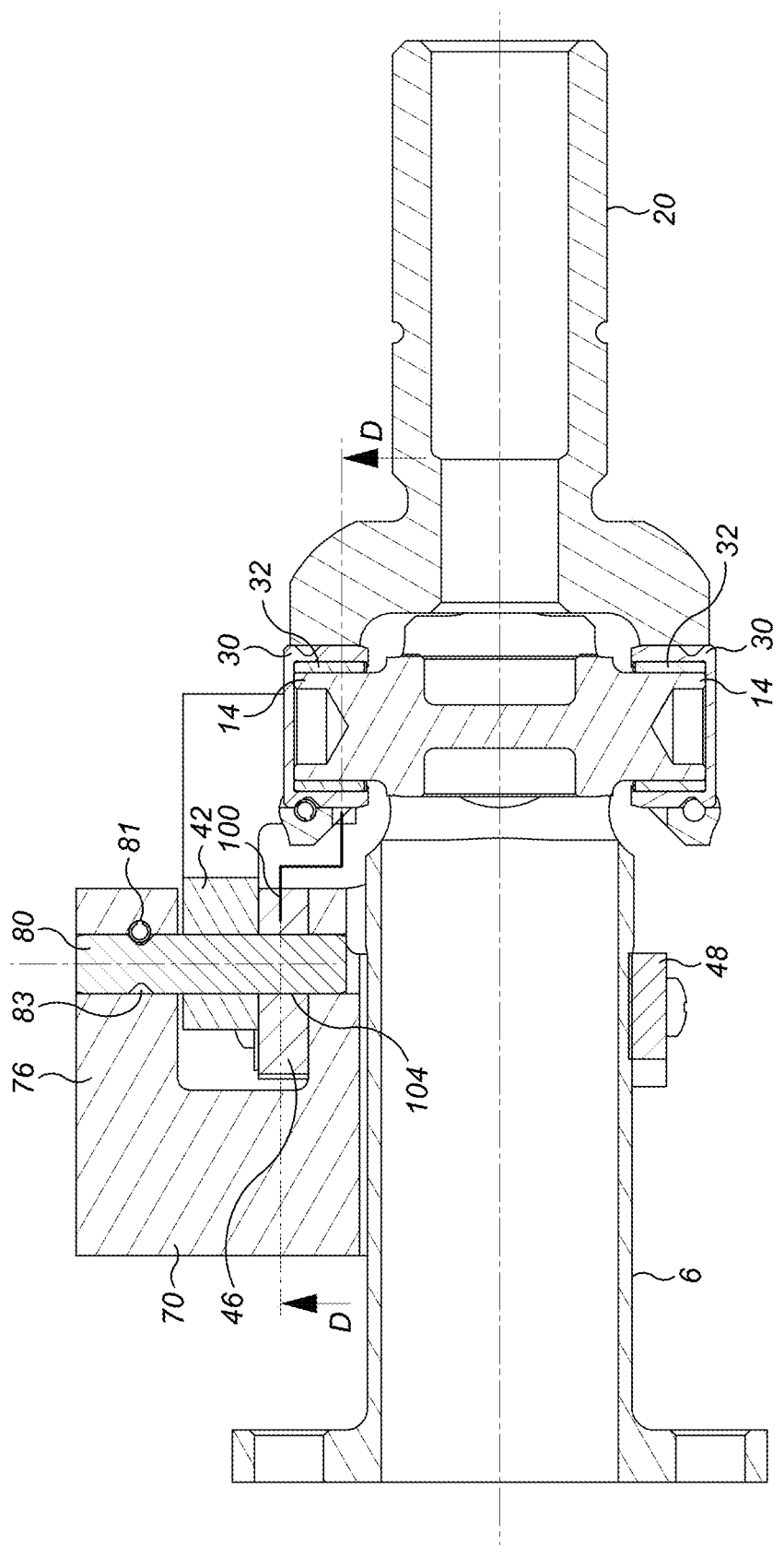
FIG. 9 shows a cross-section on the line C-C of FIG. 8.

As illustrated in FIG. 9, the ends of the trunnions 14 may, in a known manner, be covered by caps 30, with bushings 32 arranged within the caps 30. For the purposes of this disclosure, the caps 30 may be regarded as part of the trunnions 14.

It should be noted that the general construction of Cardan joints is well known in the art and the detailed construction of the Cardan joint 4 described herein is not limiting on the scope of the disclosure.

It will be understood that during use, rotation of the first joint part 6 about its axis of rotation will be transmitted to the second joint part 20 via the hub 16. However, in use, wear may occur in the bushings 32 of the Cardan joint 4 which means that a certain play may result between the first and second joint parts 6, 20. Relatively small amounts of play may be acceptable, but when the play becomes too great, it is necessary to repair or replace the Cardan joint 4. For example, in some embodiments, a play angle of 2° or less may be acceptable. Manual detection of such play is very difficult and subjective, so it is desirable to provide a tool which can provide a reliable indication of whether play is within acceptable limits. The wear check tool 2 of this disclosure provides such an indication.

Turning now to the tool 2 (which is illustrated in isolation in FIGS. 4 and 5), it comprises a base element 40, a trigger plate 42, an indicator pin 44, an indicator pin carrier 46 and a retaining element 48.

The base element 40 comprises a base element yoke 50 having a pair of opposed arms 52 for engaging over the ends of the opposed trunnions 14 of the first yoke member 8 of the Cardan joint 4. The inwardly facing distal ends 54 of the arms 52 may, as shown, be radiused so as to facilitate their positioning over the trunnions 14.

The arms 52 should exhibit some resilience such that they will always engage the ends of the trunnions 14 (or in this embodiment actually the trunnion caps 30) to avoid any play therebetween when the tool 2 is mounted to the Cardan joint 4. This can be seen in FIGS. 6 and 7 for example. Thus the material of the base element 40 should be such as to provide the arms 52 with some degree of flexibility to accommodate any adverse tolerance build up on the distance between the opposed trunnions 14.

The base element 40 further comprises a channel 56 which, as will be appreciated from FIG. 3, will fit over a shaft portion of the first joint part 6 when the tool 2 is assembled to the Cardan joint 4.

Figure 7:
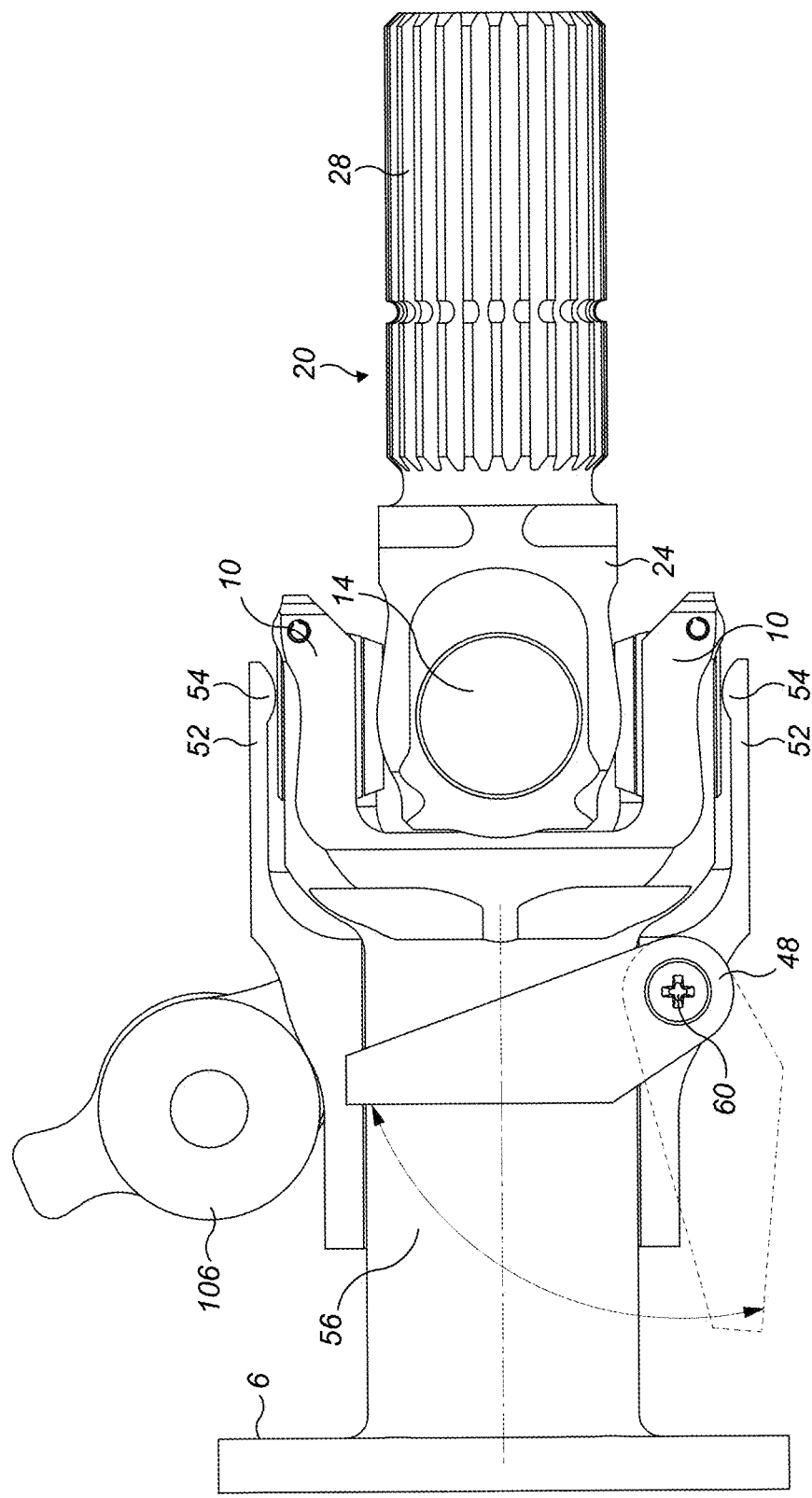
FIG. 7 shows a bottom plan view of FIG. 6.

The retaining element 48 is mounted to a lower face 58 of the base element 4 and is secured thereto by a screw or other fastener 60. As can be seen in FIG. 7 for example, the retaining element 48 may be pivoted around the fastener 60 between an open position illustrated in dotted lines in FIG. 7 and a closed position illustrated in solid lines. In the closed position, the retaining element 48 closes the channel 56 of the base element 40 and retains the tool 2 on the first Cardan joint part 6.

Figure 4:
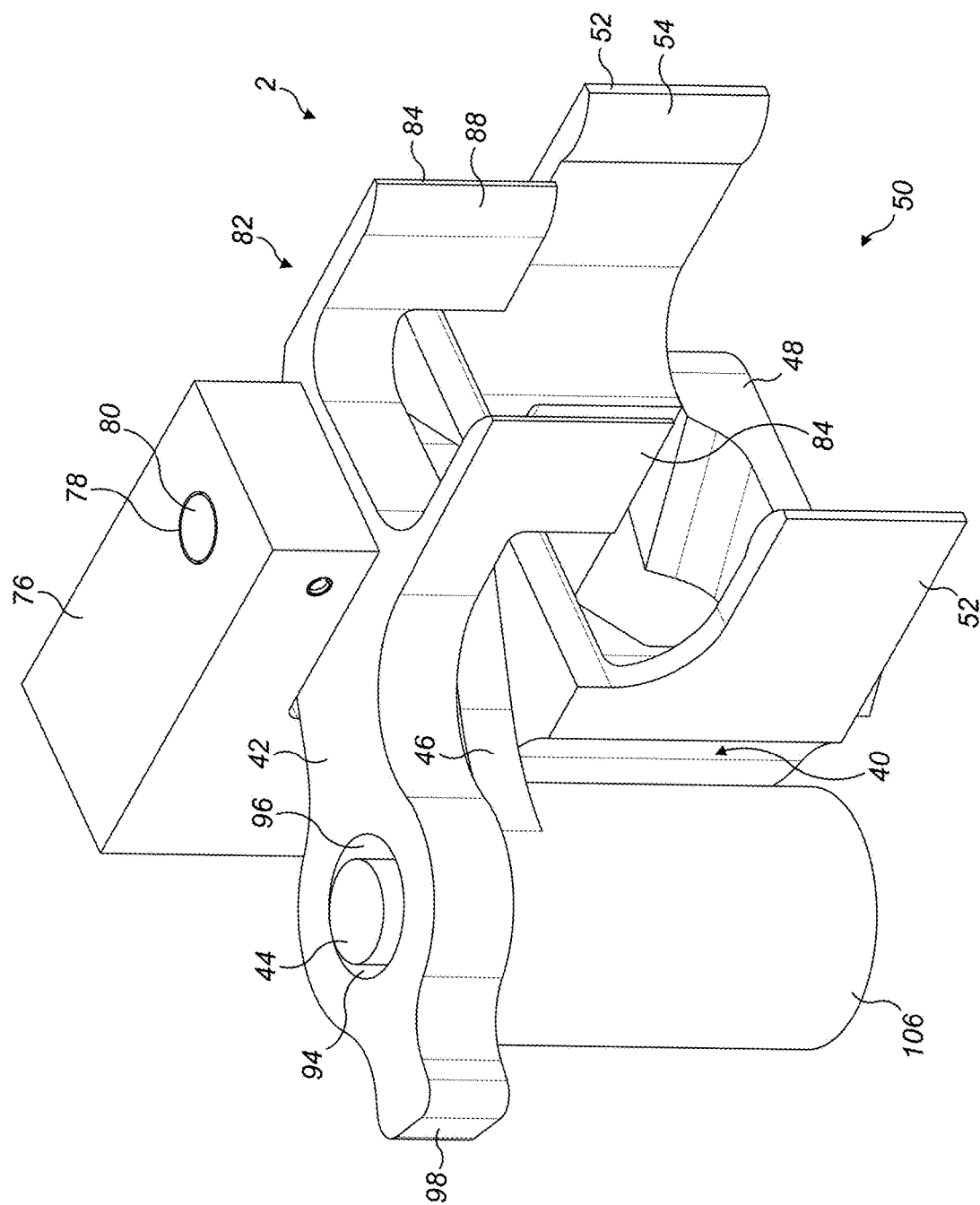
FIG. 4 shows a perspective view of the tool illustrated in FIG. 2.
Figure 5:
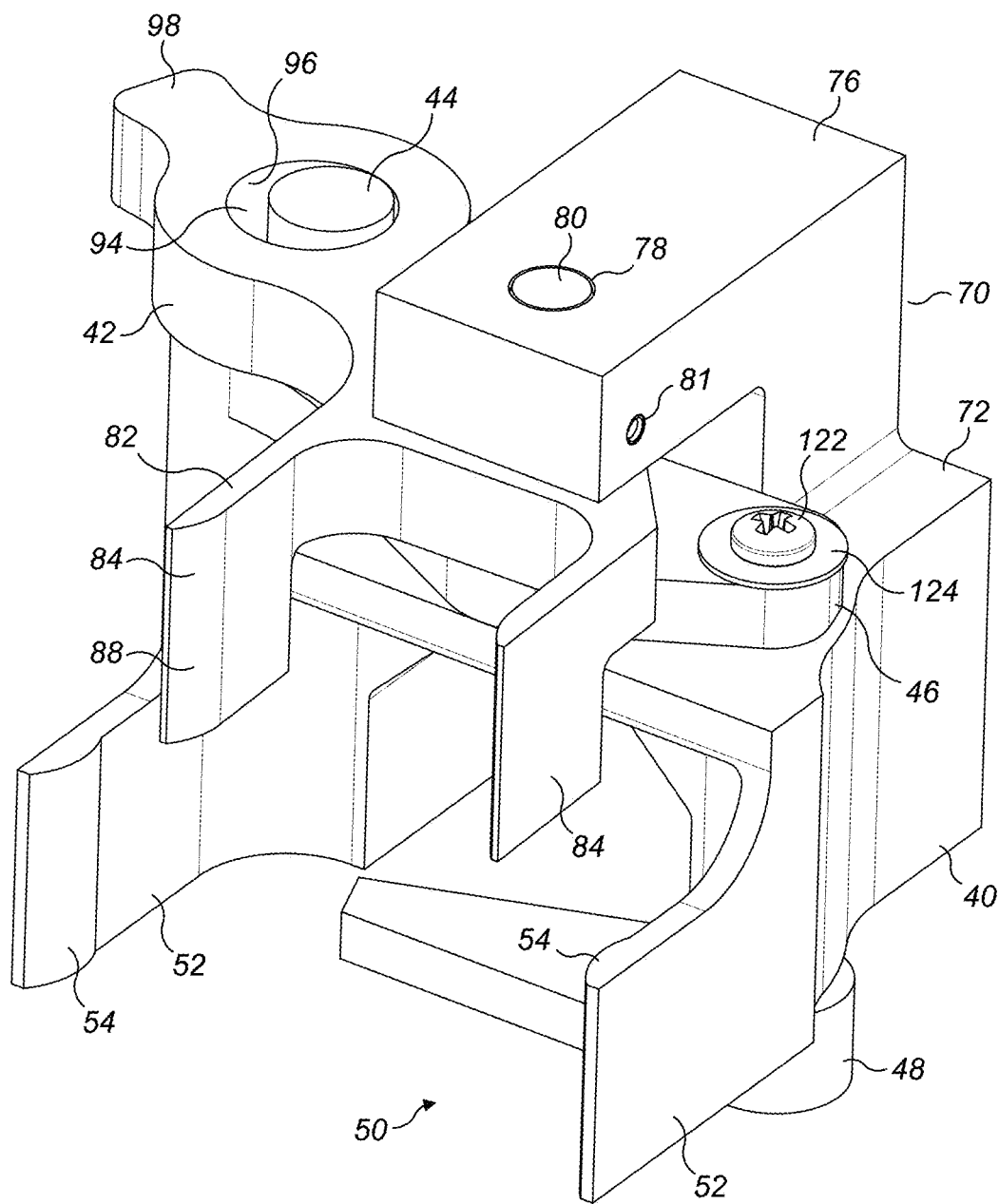
FIG. 5 shows a reverse perspective view of the tool of FIG. 2.

As can be seen in FIGS. 2, 5 and 9 for example, the base element 40 further comprises an L-shaped arm 70 extending from its upper surface 72. The L-shaped arm 70 may be formed integrally with the base element 40 or formed as a separate component and attached thereto by suitable means, for example welding, brazing or mechanical fasteners. The upper surface 72 further comprises a hole 74 (shown in FIGS. 4 and 9). The upper limb 76 of the L-shaped arm 70 lies generally parallel to the upper surface 72 of the base element 40. The upper limb 76 of the L-shaped arm 70 further comprises a hole 78 which is aligned with the hole 74 in the upper surface 72 of the base element 40. As will be described further below, these holes 74, 78 receive a trigger plate pivot pin 80. The trigger plate pivot pin 80 may be retained in the holes by means of a locking pin 81 mounted (for example push fitted) in a bore in the upper limb 76 of the L-shaped arm 70 and which may engage a peripheral groove 83 (shown in FIGS. 2, 3 and 9) formed in the trigger plate pivot pin 80.

Figure 6:
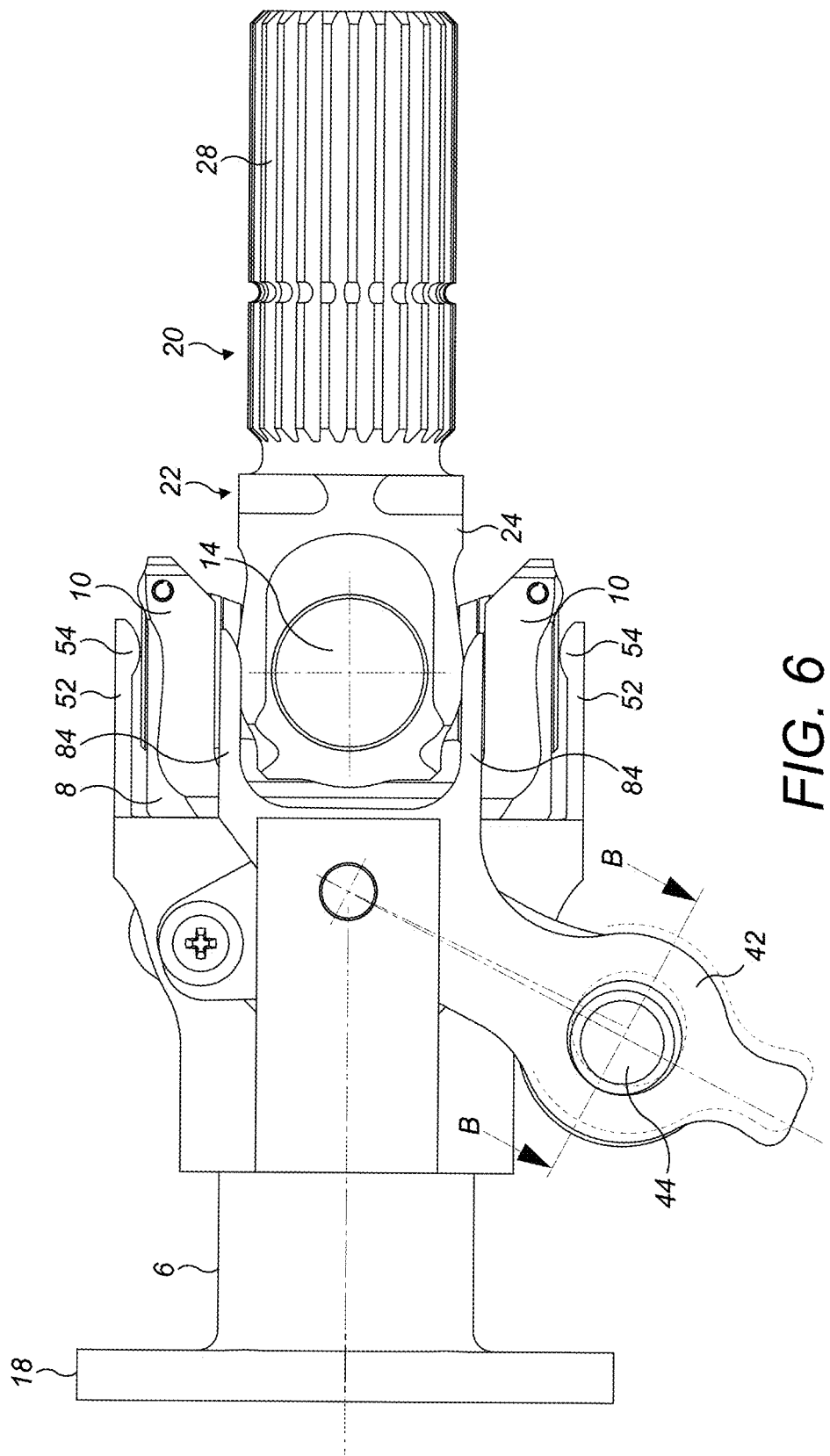
FIG. 6 shows a top plan view of the tool mounted on the Cardan joint in a first operative position with its indicator pin in an extended position.
Figure 8:
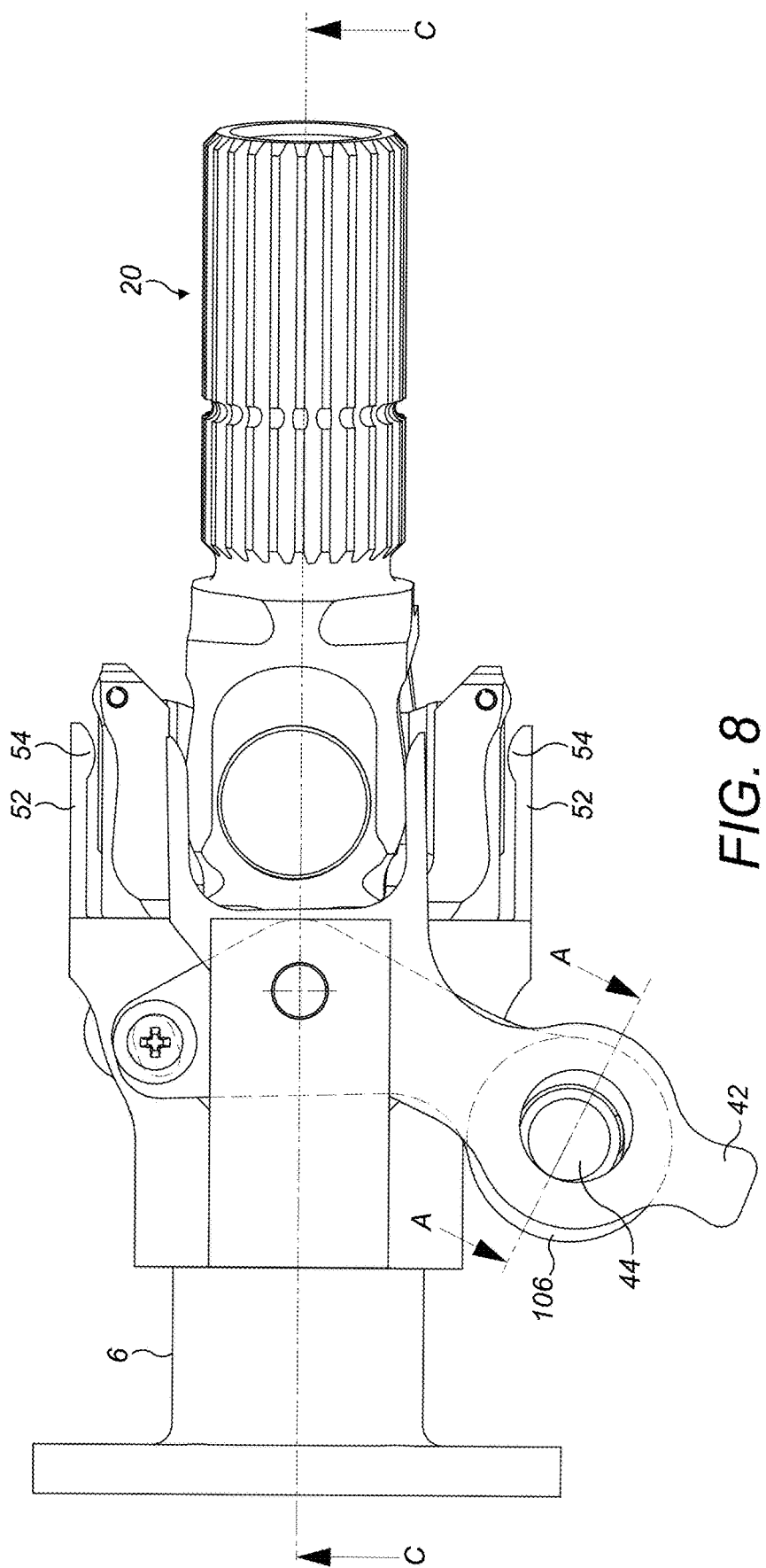
FIG. 8 shows a view similar to FIG. 6, but in a second operative position of the tool with its indicator pin in a retracted position.

The trigger plate 42 is pivotally mounted to the base element 40 about the trigger plate pivot pin 80 which defines a trigger plate pivot axis A (FIG. 8) for pivotal movement between a first pivotal position illustrated in FIG. 8 and a second pivotal position illustrated in FIG. 6.

The trigger plate 42 comprises, at one end, a trigger plate yoke 82 which comprises a pair of opposed arms 84 for engaging over the side edges 86 of the upper arm 24 of the second yoke member 22 of the Cardan joint 4. Distal portions 88 of the trigger plate yoke arms 84 may, as shown, be rounded or chamfered so as to facilitate their engagement with the arm 24 of the second yoke member 22.

Similarly to the arms 52 of the yoke member base element 40, the arms 84 of the trigger plate yoke 82 advantageously exhibit some resilience such as to ensure that the arms 84 will properly contact the side edges 86 of the upper arm 24 of the second yoke member 22 of the Cardan joint 4 to avoid any backlash in the tool 2.

As can be seen most clearly from FIG. 3, the trigger plate 42 further comprises, in an intermediate region 90, a hole 92 for receiving the trigger plate pivot pin 80. In this embodiment, the hole 92 is slightly larger in diameter than the trigger plate pivot pin 80 whereby the trigger plate 42 may pivot around the trigger plate pivot pin 80. In other embodiments, however, the trigger plate 42 may rotate with the trigger plate pivot pin 80, but that would require the trigger pivot plate pin 80 to be pivotally mounted in the holes 74, 78 in the base element 40.

As can be seen most clearly from FIGS. 4 and 5, the trigger plate 42 further comprises, at a second end, an indicator pin opening 94. The indicator pin opening 94 extends completely through the trigger plate 42 and has an inner circumferential surface 96. A handling tab 98 is also formed at the second end of the trigger plate 42 to facilitate manipulation of the trigger plate 42.

As can be seen most clearly in FIGS. 4 and 9, the indicator pin carrier 46 is mounted between the upper surface 72 of the base element 40 and a lower surface 100 of the trigger plate 42.

As can be seen most clearly from FIGS. 2 and 9, the indicator pin carrier 46 comprises a generally plate-like region 102 which is sandwiched between the upper surface 72 of the base element 40 and the lower surface 100 of the trigger plate 42 and which has a hole 104 formed therethrough for receiving the trigger plate pivot pin 80. The hole 104 should be slightly larger in diameter than the trigger plate pivot pin 80 whereby the indicator pin carrier 46 may pivot around the trigger plate pivot pin 80.

It will thus be seen that both the trigger plate 42 and the indicator pin carrier 46 rotate about the same axis, namely the trigger plate pivot axis A, but are able to rotate relative to each other. The trigger plate 40 and indicator pin carrier 46 are retained axially on the pin by means of the upper surface 72 of the base element 40 and the upper limb 76 of the L-shaped arm 70 (see, for example FIG. 9). The trigger plate 42 and indicator pin carrier 46 should be dimensioned so as to avoid excessive play in the axial direction, but not be so tight as to prevent rotation of either element.

The indicator pin carrier 46 further comprises an indicator pin mounting bore 106 shown for example in FIGS. 2, 4, 11 and 12. This bore 106 is defined by a cylindrical wall 108 which extends downwardly from the generally plate like region 102. As can be seen for example in FIG. 4, this cylindrical wall 108 is arranged adjacent a side of the base element 40.

Figures 11, 12:
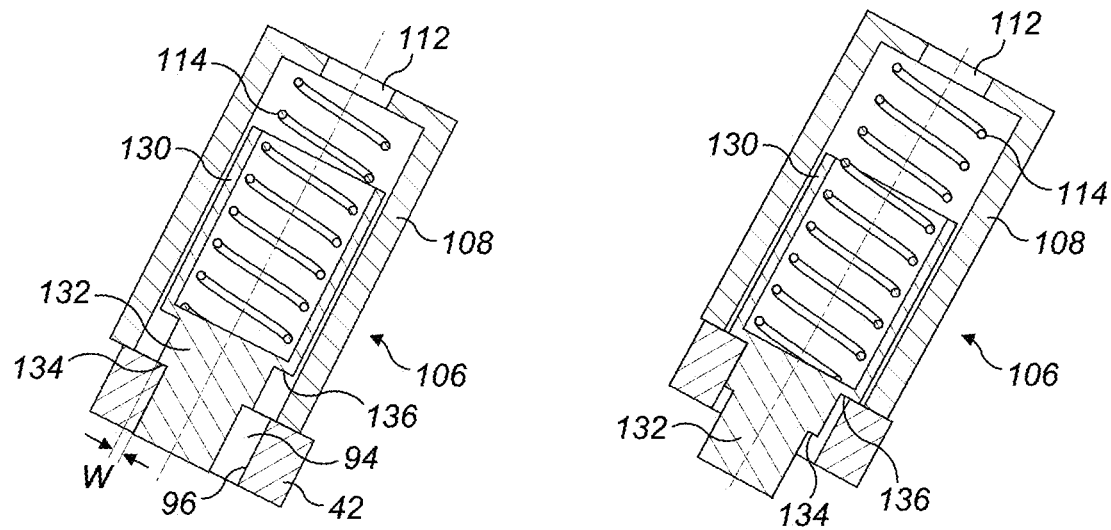
FIG. 11 shows a sectional view along line A-A of FIG. 8.
FIG. 12 shows a sectional view along line B-B of FIG. 6.

The bore 106 is open at its upper end 110 and also has an opening 112 at its lower end to allow for drainage. As can be seen in FIGS. 11 and 12, the bore 106 slidably receives the indicator pin 44 and accommodates an indicator pin biasing spring 114 as will be described further below.

Figure 10:
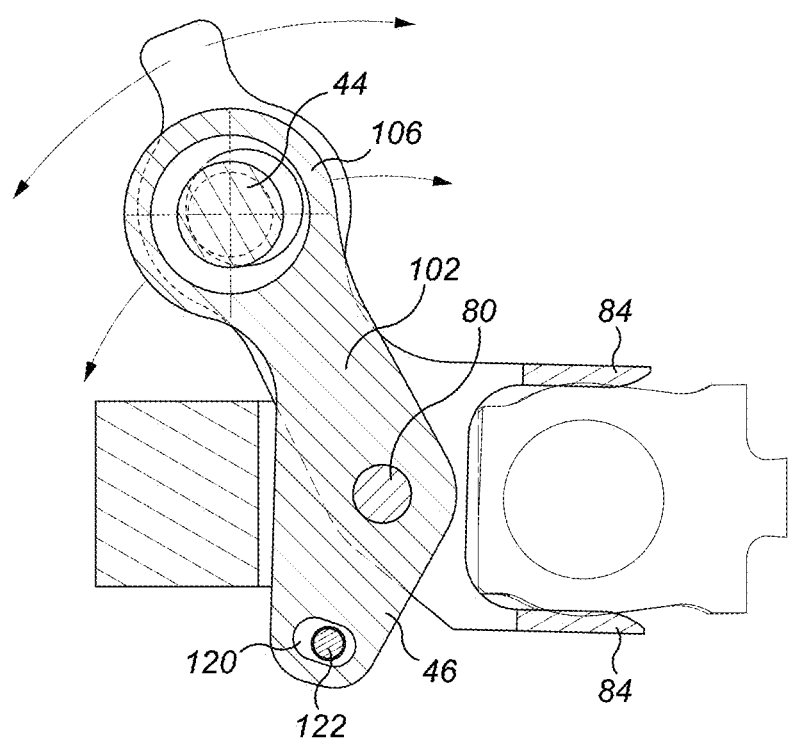
FIG. 10 shows a cross-section along line D-D of FIG. 9.

The indicator pin carrier 46 further comprises a calibration slot 120 (best seen in FIGS. 2, 3 and 10) formed in its end opposite the indicator pin mounting bore 106. This can be seen, for example, in FIG. 10. A holding element 122, for example a fastener, such as a screw fastener or a bolt (with, for example, a washer 124) may extend through the calibration slot 120 into the base element 40. As will be described further below, the holding element 122 should be tightened sufficiently to allow a user to rotate the indicator pin carrier 46 during calibration of the tool 2, but to prevent the indicator pin carrier 46 moving with the trigger plate 42 during the inspection process. In embodiments, the fastener 122 may be pre-tightened to a desired degree before the tool 2 is applied to the Cardan joint 4 to avoid the need to tighten the fastener 122 in situ, which may be difficult.

Whilst shown at the opposite end from the indicator pin mounting bore 106, depending on the particular shape of the indicator pin carrier 46, the calibration slot 120 may be provided in any suitable location on the indicator pin carrier 46. The slot 120 may have any suitable shape.

Turning now to the indicator pin 44, whose detail can be seen most clearly in FIGS. 11 and 12, this comprises a hollow body portion 130 which receives the biasing spring 114. Of course in other embodiments, the indicator pin 44 may be a solid pin with the biasing spring abutting a bottom surface of the pin. The indicator pin also comprises a pin head 132. As can be seen in FIGS. 11 and 12, the indicator pin head 132 is received within the opening 94 of the trigger plate 42. It is movable between a retracted position illustrated in FIGS. 8 and 11 and an extended position shown in FIGS. 6 and 12. In this embodiment, in the retracted position, the indicator pin head 132 does not protrude from the trigger plate opening 94 but does so in the extended position.

The indicator pin head 132 comprises a trigger shoulder 134 which, in the retracted position of the indicator pin 44 shown in FIG. 11 is engageable with the lower surface 100 of the trigger plate 42 adjacent the indicator pin opening 94 when a sidewall portion 136 of the indicator pin head 132 above the trigger shoulder 134 engages the internal circumferential surface 96 of the indicator pin opening 94 of the trigger plate 92.

As will be described further below, the width W of the trigger shoulder 134 is chosen so as to correspond to the play limit for the Cardan joint 4.

The indicator pin head 132 further comprises a retaining shoulder 136 which, when the indicator pin 44 is in its extended position shown in FIG. 12, will engage the lower surface 100 of the trigger plate 42 adjacent the indicator pin opening 94 so as to limit the protrusion of the indicator pin 44 from the indicator pin opening 94.

Having described the construction of the tool 2, its mode of operation will now be described.

As a first step, the tool 2 is mounted to the Cardan joint 4 such that the base element yoke arms 52 engage over the ends of the trunnions 14 or trunnion caps 30 mounted in the opposed arms 12 of the first yoke member 10 of the Cardan joint 4. To facilitate this, the retaining element 48 may be rotated to a position in which it does not interfere with the placement of the base element 40 and, after placement, moved back to its retaining position. The resilience of the base element yoke arms 52 ensures a backlash free engagement of the base element 40 with the Cardan joint 4.

At the same time, the trigger plate yoke arms 84 are mounted over the one arm 24 of the second yoke member 22 of the Cardan joint 4. Again the resilience of the trigger plate yoke arms 84 ensures a backlash free engagement of the trigger plate 42 with the arm 24 of the second yoke member 22.

The tool 2 is then calibrated. The calibration should be carried out when the Cardan joint 4 is at a maximum backlash condition, i.e. with the first and second yoke members 10, 22 of the Cardan joint 4 rotated away from one another to the maximum extent about their rotational axis. A user should maintain the Cardan joint 4 in that condition as the tool 2 is being mounted to the Cardan Joint 4.

To calibrate the tool 2, the indicator pin 44 is pushed into the indicator pin receiving bore 106 and the indicator pin carrier 46 then rotated about the pivot pin 80 until such time as the sidewall portion 136 of the indicator pin head 132 above the trigger shoulder 134 engages the internal circumferential surface 96 of the indicator pin opening 94 of the trigger plate 92. As discussed above the fastener 122 is tightened to a degree which allows this movement. If over-tightened, the fastener 122 would not permit such movement. However, this degree of tightening will be sufficient to hold the indicator pin carrier 46 in that position once the calibration has been effected and will prevent the indicator pin carrier 46 from moving with the trigger plate 42 when the latter moves during the test procedure.

In this position, the trigger shoulder 134 engages with the lower surface 100 of the trigger plate 42 so as to retain the indicator pin in its retracted position. As discussed above, the width W of the trigger shoulder 134 is chosen so as to correspond to a maximum permissible play within the Cardan joint 4.

Depending on the orientation of the tool 2 and Cardan joint 4, the indicator pin may engage on either the portion of internal surface 96 of the indicator pin opening 94 as shown, or on an opposite portion of the internal surface 96. In that case, the joint 4 will be rotated in use in an opposite direction from that illustrated in the Figures.

The tool 2 is then ready to use. An operator may then manually attempt to rotate the second yoke member 22 of the Cardan joint 4 about its rotational axis from its maximum backlash position while preventing rotation of the first yoke member 6 of the Cardan joint 4 about its rotational axis. If there is no wear in the Cardan joint 4, there will be no relative rotation of the first and second yoke members 6, 22 of the Cardan joint 4. However, once the joint 4 begins to wear, there will be relative rotational movement of the first and second yoke members 6, 22 of the Cardan joint 4. Such a rotational movement of the second yoke member 22 of the Cardan joint 4 will, by virtue of the arms 24 of the second yoke member 22 engaging with the arms 84 of the trigger plate, cause the trigger plate 42 to rotate about the pivot pin 48. As discussed above, movement of the trigger plate 42 will not be transferred to the indicator pin carrier 46 as the latter is retained in its calibrated position by the fastener 122.

The rotation of the trigger plate 42 about the pivot pin 80 will be proportional to the rotation of the second yoke member 22. Accordingly, it is possible to calculate the amount the trigger plate 42 will rotate for a threshold wear value, and thus calculate how far the trigger plate will move at the location of the indicator pin opening 94 in that situation. That distance will be chosen for the width W of the trigger shoulder of the indicator pin 44. In a typical application, the width W may be about 1 mm for a 2 degree rotation of the second yoke member 22 of the Cardan joint 4 relative to the first yoke member 8.

Provided the wear in the Cardan joint 4 is less than the predetermined maximum permissible wear, the trigger shoulder 134 of the indicator pin 44 will remain in contact with the lower surface 100 of the trigger plate 42 and the indicator pin 44 will remain in its retracted position as shown in FIGS. 5, 8 and 11. However, should the wear exceed the maximum permissible value (manifested by a certain angular rotation of the second yoke member 22 of the Cardan joint, for example greater than) 2°) then the lower surface 100 of the trigger plate 42 will move beyond the trigger shoulder 134 of the indicator pin 44 which will then move outwardly of the bore 106 to the second, extended position shown in FIGS. 6 and 12. In this position, the indicator pin head 132 protrudes from the indicator pin opening 94 of the trigger plate 92 and provides a clear indication to the operator that the tool 2 has been triggered, thereby indicating that the Cardan joint 4 has worn excessively and requires repair or replacement. Moreover, the retaining shoulder 136 of the indicator pin 44 will produce an audible click as it engages the lower surface 100 of the trigger plate 42. Thus, even should the operative not be able to clearly see the indicator pin, an audible indication will be provided to the operator.

It will thus be seen that the embodiment described above is advantageous over the previous assessment procedure in that it allows for an objective, rather than subjective, indication of joint wear. The tool 2 provides a "yes/no" indication of excessive wear rather than having to rely upon the subjective judgement of an operator. The indicator pin 44 further provides an easy visual and/or audible indication of the triggering of the tool 2.

It will be understood that the above description is of a non-limiting embodiment of the disclosure and that modifications may be made thereto without departing from the scope of the disclosure.

The invention claimed is:

1. A tool for checking wear in a Cardan joint, the tool comprising:
    a base element comprising a base element yoke having a pair of opposed arms for engaging over the ends of an opposed pair of trunnions mounted in openings in opposed arms of a first yoke member of the Cardan joint;
    a trigger plate pivotally mounted to the base element about a trigger plate pivot axis (A) for pivotal movement between a first pivotal position and a second pivotal position and having, at one end, a trigger plate yoke with a pair of opposed arms for engaging over one arm of a second yoke member of the Cardan joint and, at another end, an indicator pin opening;
    an indicator pin;
    an indicator pin carrier pivotally mounted to the base element to permit the angular position of the indicator pin carrier to be adjusted relative to the trigger plate, and arranged between the base element and the trigger plate; and
    a biasing element for biasing the indicator pin in a direction towards the trigger plate;
    the indicator pin comprising an indicator pin head which extends into the indicator pin opening in the trigger plate and a trigger shoulder for engagement with a surface of the trigger plate adjacent the indicator pin opening in a first pivotal position of the trigger plate for maintaining the indicator pin in a retracted position and for disengagement from the surface of the trigger plate in a second pivotal position of the trigger plate such that the indicator pin may move to an extended position in the indicator pin head protrudes or protrudes further from the indicator pin opening.

2. The tool as claimed in claim 1, wherein the indicator pin carrier comprises a bore for receiving the indicator pin, and the biasing element comprises a biasing spring received within the bore for biasing the indicator pin out of the bore.

3. The tool as claimed in claim 1, wherein the indicator pin carrier is pivotally mounted to the base element about the trigger plate pivot axis (A).

4. The tool as claimed in claim 1, wherein the indicator pin carrier comprises a calibration slot permitting the adjustment of the angular position of the indicator pin carrier relative to the trigger plate.

5. The tool as claimed in claim 4, further comprising a holding element extending through the adjustment slot for holding the indicator pin carrier in the desired angular position.

6. The tool as claimed in claim 5, wherein the holding element is a screw fastener.

7. The tool as claimed in claim 1, wherein the base element further comprises a retaining arm extending over the trigger plate and the indicator pin carrier, and a pivot pin mounted between the retaining arm and the base element, the trigger plate and/or the indicator pin carrier being pivotally mounted about the pivot pin.

8. The tool as claimed in claim 1, further comprising a retaining element for selectively retaining the base element to the Cardan joint.

9. The tool as claimed in claim 8, wherein the retaining element is pivotally mounted to a lower portion of the base element and pivotable between an open position which permits the base element yoke to be positioned on the Cardan joint and a closed position which retains the base element to the Cardan joint.

10. The tool as claimed in claim 1, wherein the indicator pin further comprises a retaining shoulder which is engageable with the surface of the trigger plate in the second pivotal position of the trigger plate to limit the protrusion of the indicator pin head from the trigger plate opening.

11. The tool as claimed in claim 1, wherein the arms of the base element yoke are resilient.

12. The tool as claimed in claim 1, wherein the arms of the trigger plate yoke are resilient.

13. The tool as claimed in claim 1, wherein inwardly facing distal end portions of the arms of the base element yoke are rounded or chamfered.

14. The tool as claimed in claim 1, wherein distal end portions the arms of the trigger plate yoke are rounded or chamfered.

15. A method of checking for excessive wear in a Cardan joint using a tool as claimed in claim 1, comprising:
  mounting the tool to the Cardan joint such that the base element yoke arms engage over the ends of an opposed pair of trunnions mounted in opposed arms of the first yoke member of the Cardan joint and the trigger plate yoke arms engage over the one arm of the second yoke member of the Cardan joint;
  retracting the indicator pin;
  adjusting the angular position of the indicator pin carrier relative to the trigger plate such that a circumferentially outer portion of the indicator pin head engages with an internal circumferential surface portion of the trigger plate opening;
  rotating the second yoke member of the Cardan joint about its rotational axis while preventing rotation of the first yoke member of the Cardan joint about its rotational axis, or vice versa, relative rotation of the first and second yoke members of the Cardan joint causing the trigger plate to rotate about the trigger plate pivot axis (A); and
  determining that excessive wear has occurred if the rotation of the trigger plate is such that the indicator pin head moves from its retracted position to its extended position.

\* \* \* \* \*